April 18, 1944. W. E. WOODARD ET AL 2,346,715
STEAM LOCOMOTIVE CONSTRUCTION
Filed Feb. 20, 1941 9 Sheets-Sheet 1
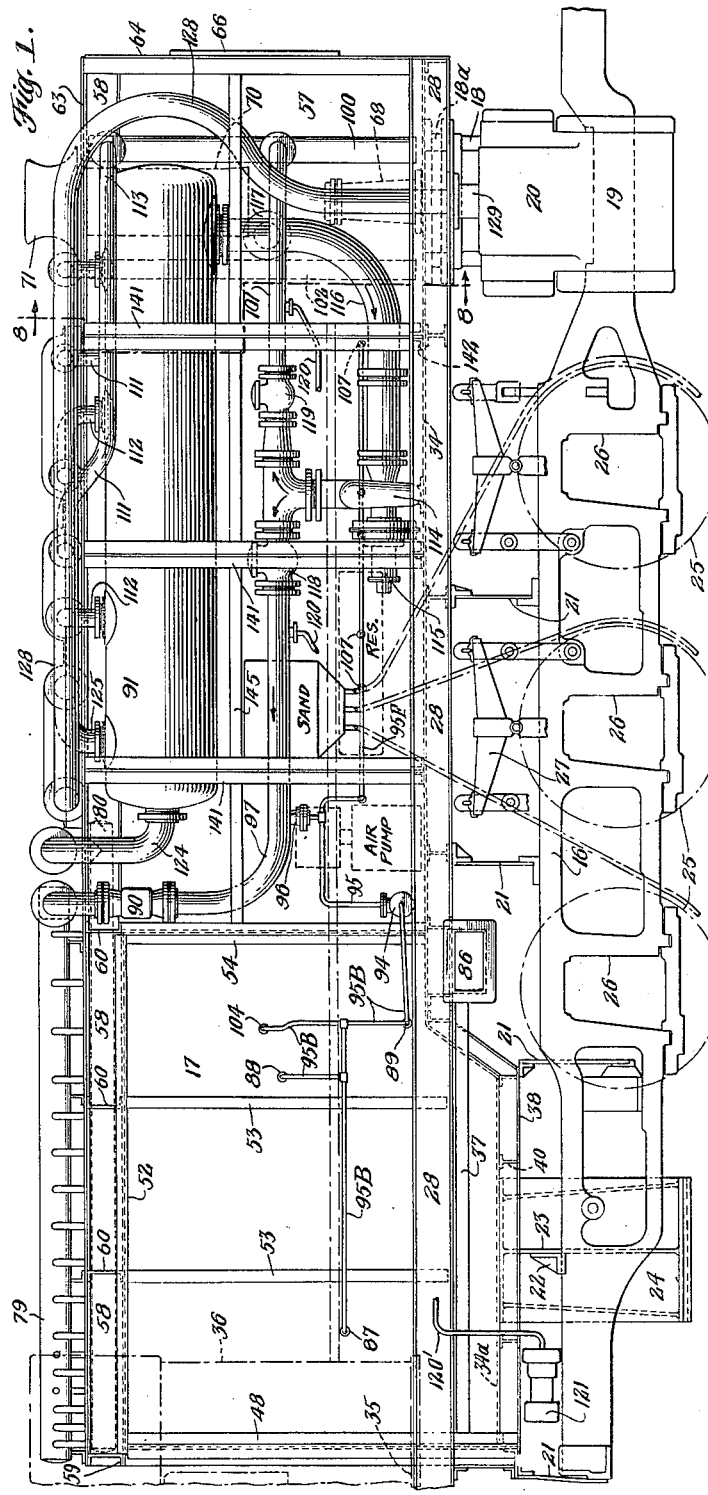
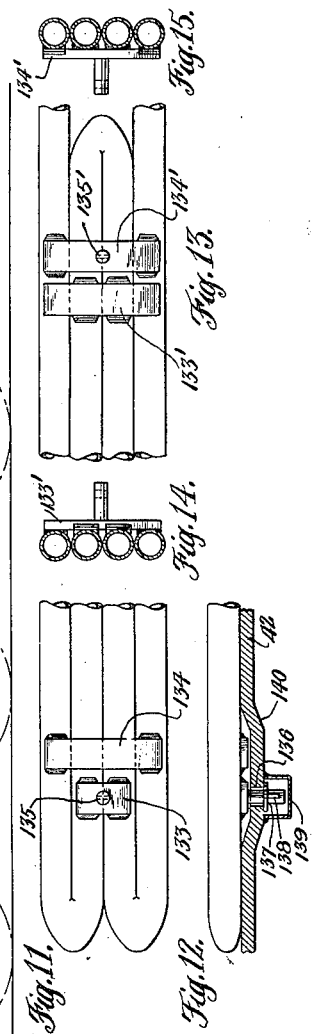
INVENTORS
William E. Woodard
Arthur H. Filander
BY
Synnestvedt + Lechner
ATTORNEYS April 18, 1944.   W. E. WOODARD ET AL   2,346,715
STEAM LOCOMOTIVE CONSTRUCTION
Filed Feb. 20, 1941   9 Sheets-Sheet 2

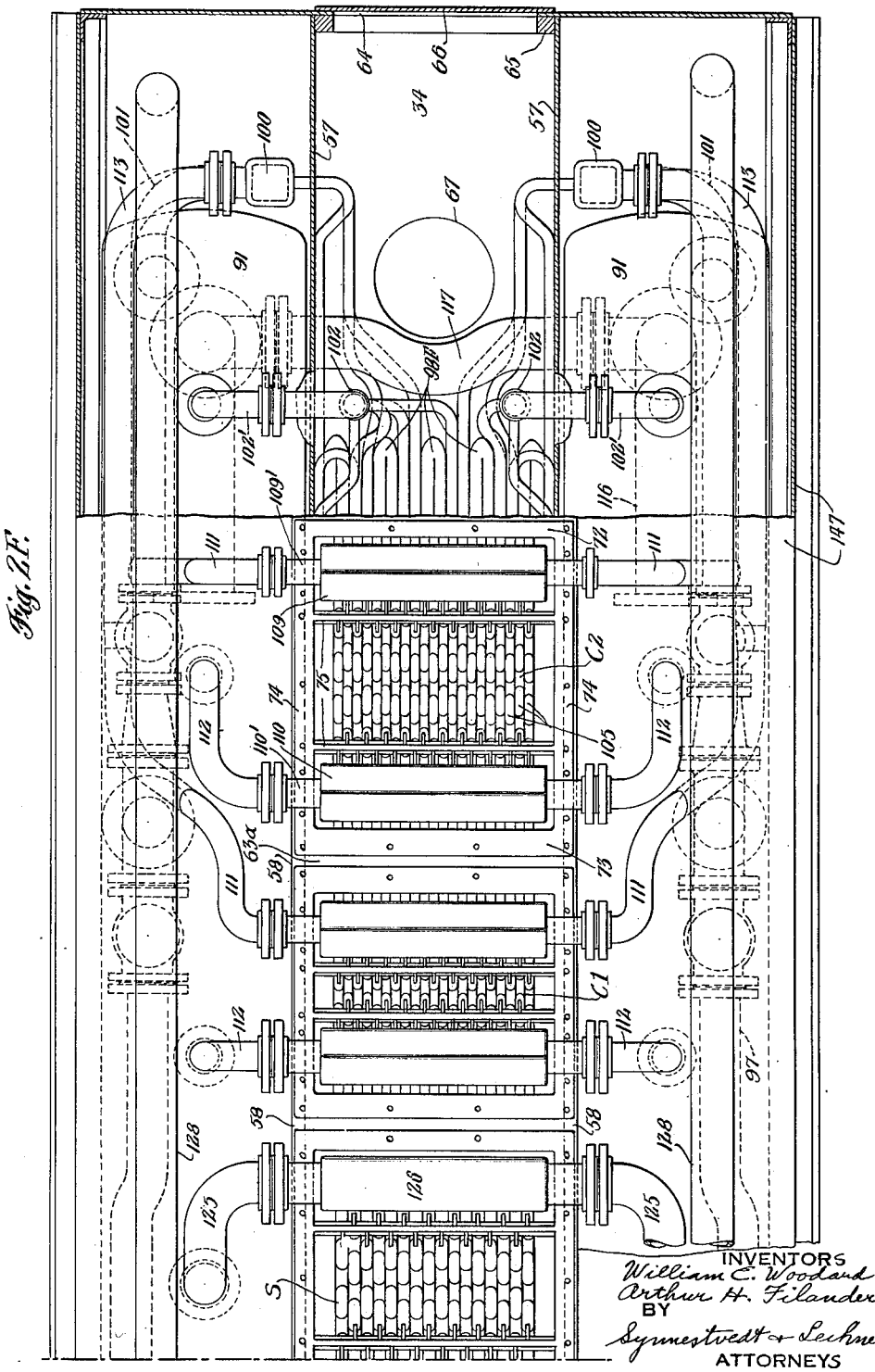

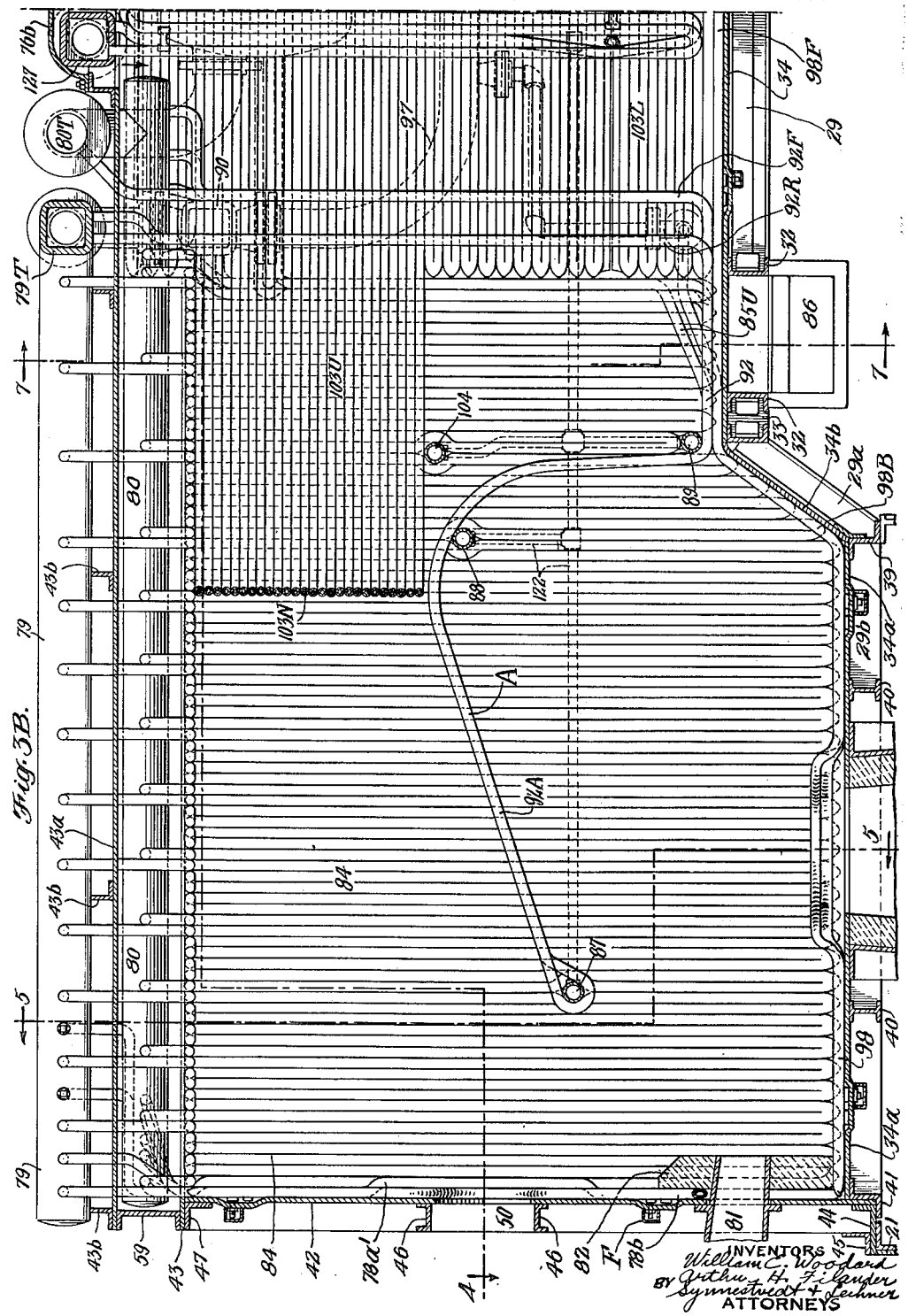

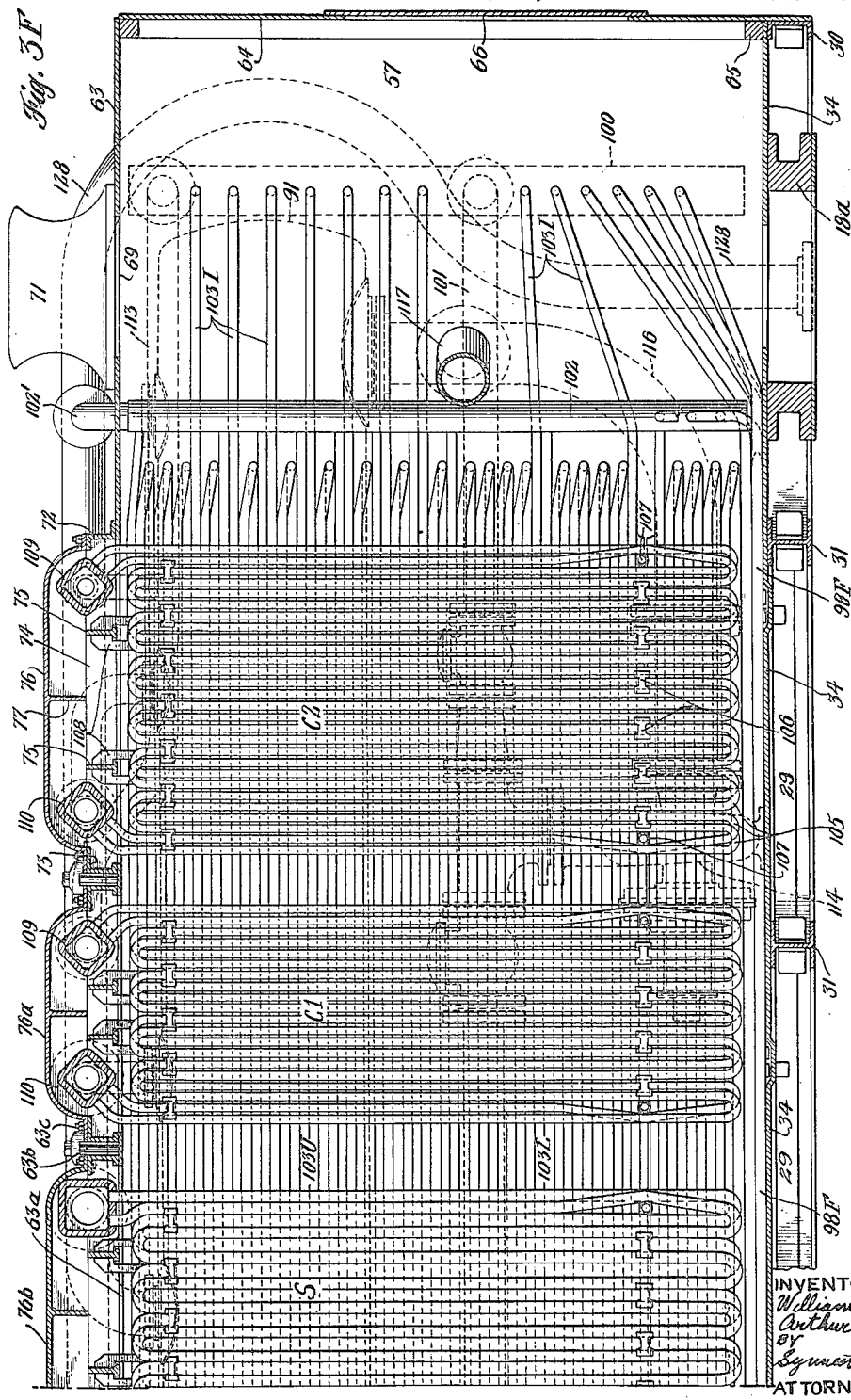

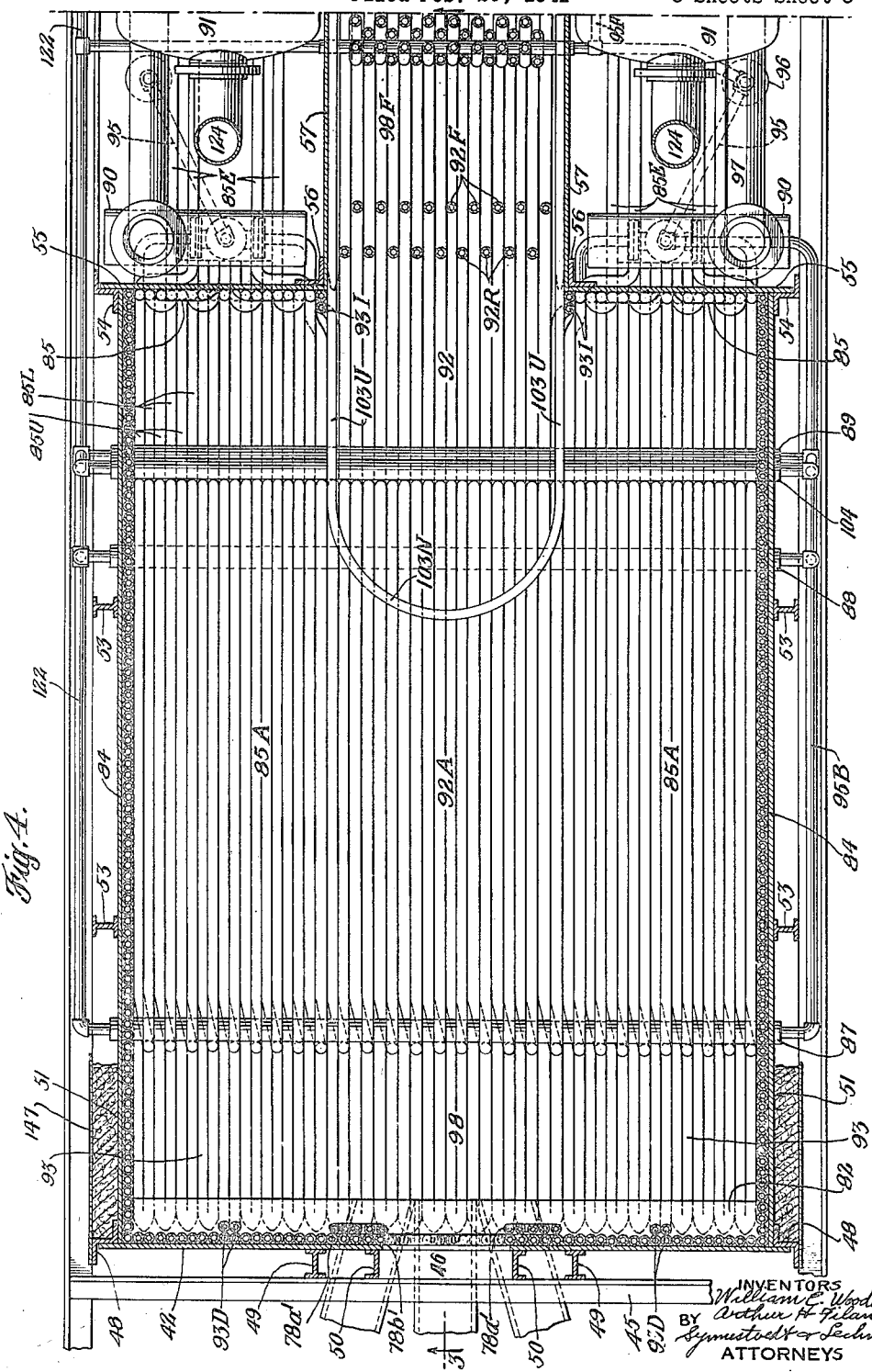

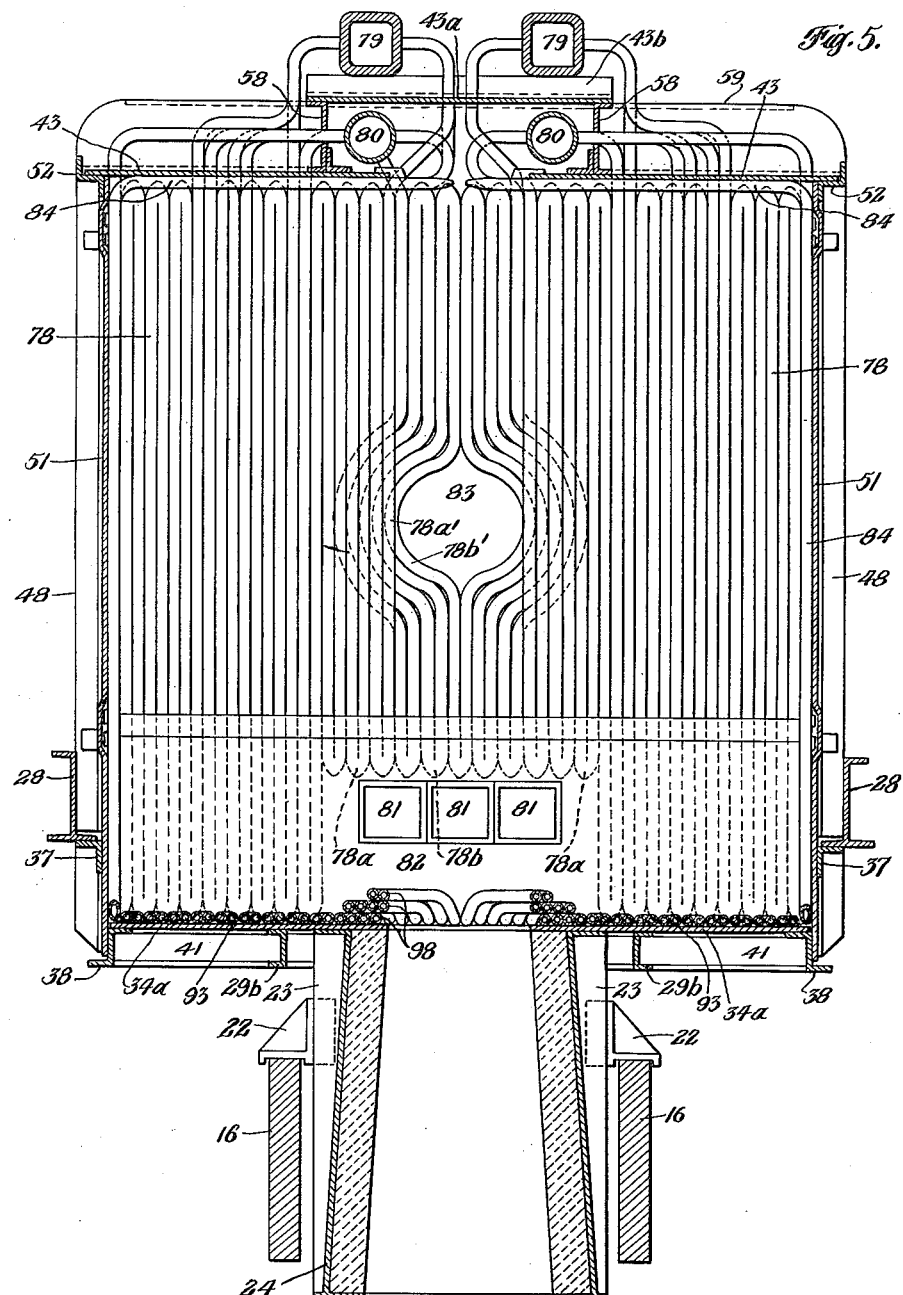

April 18, 1944.   W. E. WOODARD ET AL   2,346,715
STEAM LOCOMOTIVE CONSTRUCTION
Filed Feb. 20, 1941   9 Sheets-Sheet 9

INVENTORS
William E. Woodard
Arthur H. Felander
BY
Symmestvedt & Lechner
ATTORNEYS

UNITED STATES PATENT OFFICE 2,346,715

STEAM LOCOMOTIVE CONSTRUCTION

William E. Woodard, Forest Hills, and Arthur H. Filander, New York, N. Y.; said Arthur H. Filander assignor to Lima Locomotive Works, Incorporated, Lima, Ohio, a corporation of Virginia; Phebe H. Woodard, executrix of said William E. Woodard, deceased, assignor to Phebe H. Woodard Application February 20, 1941, Serial No. 379,772

34 Claims. (Cl. 122—235)

This invention relates to steam locomotive construction, and particularly to the construction of steam locomotives of a type employing forced-circulation boiler elements housed within a shell which is wholly or in large part free of the boiler pressure. Such type of locomotive is disclosed in our copending application Serial No. 223,528, filed August 6, 1938 (issued May 4, 1943, as Patent 2,318,040), wherein the shell forms a major element of strength and stiffness of the locomotive foundation. In certain aspects, the present invention constitutes an improvement over that of said copending case.

One of the primary objects of the present invention is to increase the power output and other capabilities of a steam locomotive, within given limitations of size and weight.

Another object of the invention is to make feasible the use of low-grade and/or pulverized fuel, which heretofore has presented serious problems such as poor combustion, inadequate rate of steaming, clogging up with slag or other deposits, etc.

A further object is to secure the foregoing advantages in a construction which can be readily adapted for burning either liquid fuel, lump fuel or pulverized fuel.

Another important object of the invention is to simplify and lower the cost of first construction, maintenance and repair of locomotives of the water-tube type, and especially of the type having forced-circulation water-tube coils constituting all or a major part of the radiant and convection heating surfaces of the boiler; and particularly to reduce the number of patterns of tube coils required in the boiler assembly.

A further object of the invention is to improve and simplify the mounting, support and retention of the tube coils in relation to the enclosing shell, and to greatly simplify the separate and independent removal and replacement of individual tube coils or banks of tubes.

Still another object is to strengthen and improve the shell itself as a structural member of the locomotive foundation, and to coordinate therewith parts of the boiler, such as drums, headers, and the like, in a manner to secure an interbracing between them and the shell.

A further object is to improve the arrangement and location of boiler elements, pumping equipment, connecting pipes, and locomotive auxiliaries, with relation to each other and to the shell and other parts of the locomotive, for the sake of convenience, compactness, ruggedness, safety, and economy.

More specifically, the invention contemplates the attainment of the foregoing and other objects and advantages by the features and details of construction and arrangement hereinafter fully described with reference to the accompanying drawings.

Figure 1 is a side elevation of a locomotive embodying the present invention, this view omitting the tender, most of the cab, and certain other parts such as elements of the running gear and the insulating lagging with its outside sheath, but illustrating the pressure-free shell of the boiler in its association with the engine bed, and showing also one of the steam-and-water drums, and such major elements of the boiler circulating system as are disposed on the outside of the shell.

Figures 2B and 2F, illustrating respectively the back and front portions, together constitute an enlarged plan view of the locomotive of Figure 1, but with portions of the top of the shell broken away, cover plates removed, and certain parts omitted, so as to show water-evaporating and other elements within the shell.

Figures 3B and 3F, illustrating respectively the back and front portions, together constitute a vertical longitudinal mid-section through the locomotive boiler and associated parts, taken at the line marked 3 in Figure 4, and showing the grouping of the various internal boiler elements, the association of the tube coils with the headers, the positioning and support of the parts, etc.

Figure 4 is an irregular horizontal section taken approximately on the broken line marked 4 in Figure 3B, further illustrating the disposition of various boiler parts in the region of the firebox.

Figure 5 is an irregular transverse section through the firebox, slag hopper and associated parts, taken on the line 5—5 of Figure 3B.

Figure 10 is a detail, taken in section through two adjacent water tube elements, and showing in elevation an interconnecting positioning clamp welded to said elements.

Figure 11 is a fragmentary elevational view of the looped ends of two adjacent water tube elements, and illustrating a pair of positioning devices, constituting a feature of the invention adapted to relatively position and to secure said elements.

Figure 12 is an edge elevation of the assembly of Figure 11, in association with securing means located at a wall of the shell structure, the wall being shown in section.

Figure 13 is a view similar to Figure 11 but showing a modified pair of positioning devices.

Figure 14 is a left-hand view of the assembly of Figure 13, with the tube elements shown in section.

Figure 15 is a right-hand view of the assembly of Figure 13, with the tube elements shown in section.

Figure 2B:
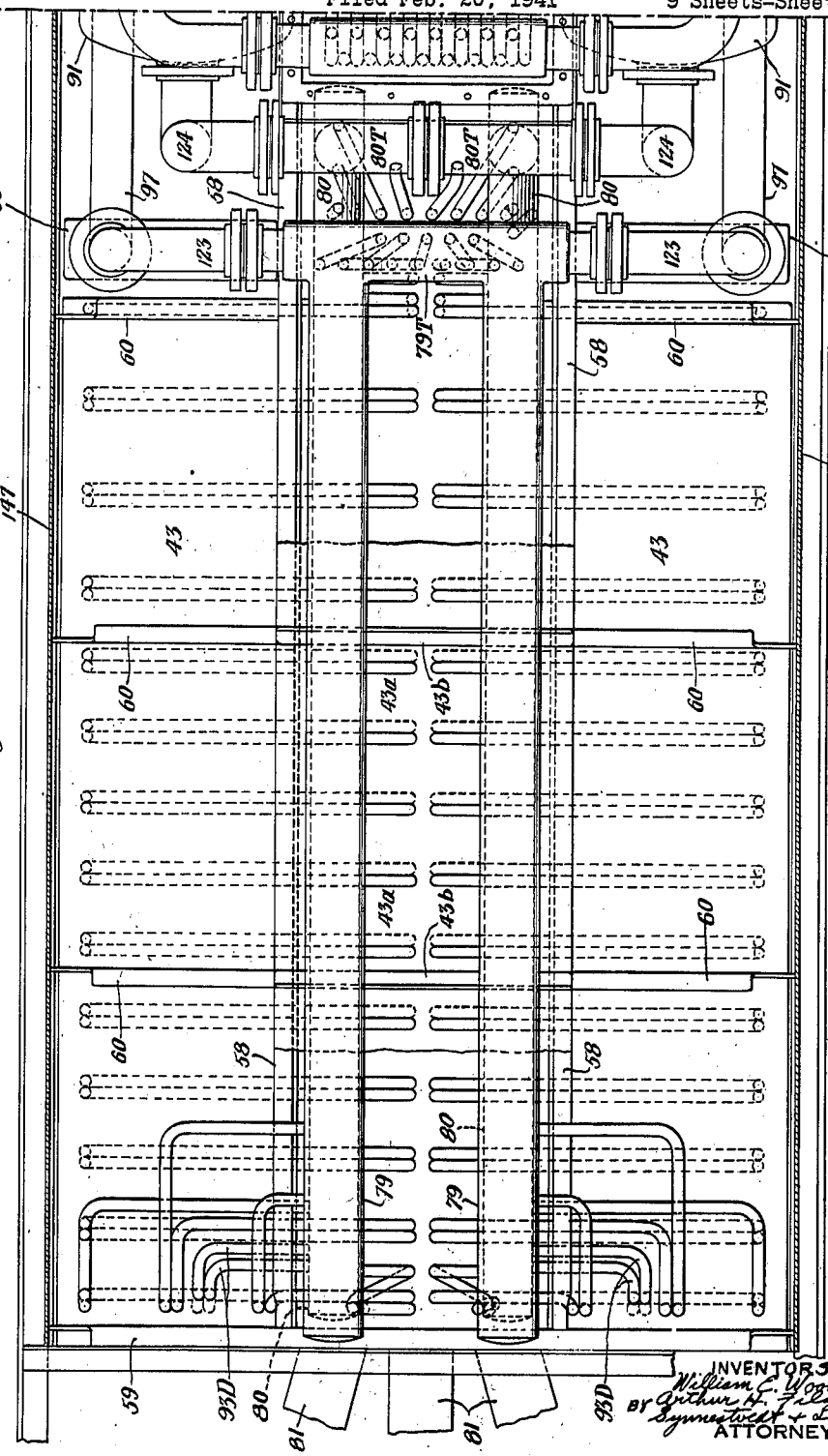

By reference first to Figure 1, it will be seen that the locomotive comprises main longitudinal framing 16 and a longitudinally extending pressure-free shell 17 superimposed on said framing and substantially coextensive in length. A saddle structure 18, with associated cylinders and valve chests 19 and 20, securely interconnects the front end of the frame 16 and shell 17. The shell itself has a heavy bracing casting 18a cooperating with the saddle and braced to the main beams of the shell by the transverse base-plate 18b (see Figures 3F and 8). Flexible or movable joints make up the remainder of the interconnection between the frame 16 and shell 17. Most of these joints preferably take the form of waist sheets 21 interconnecting said parts by means of suitable brackets as shown, whereby to accommodate longitudinal expansion and contraction of the shell 17 relative to the frame 16 while maintaining joint solidity of these structures in transverse directions. A sliding interconnection is also provided, as by brackets 22 (see also Fig. 5) which are secured to flanges 23 of the slag hopper 24 and are seated for longitudinal sliding on the frame structure 16.

Driving wheels 25, which may be actuated from cylinders 19 through the usual running gear parts (not shown) may be journaled in the pedestal ways 26 of the frame for relative vertical motion, as accommodated by the spring rigging fragmentarily shown at 27.

As in the case of our above-mentioned copending application, the shell 17 in its preferred form is a major structural element of the locomotive foundation, and as it is free of the burden of withstanding the boiler pressure its construction can be designed primarily from the standpoint of securing rigidity of the locomotive in all transverse directions. In this respect, the present invention provides substantial improvement over said prior application, as will now appear.

Figure 7:
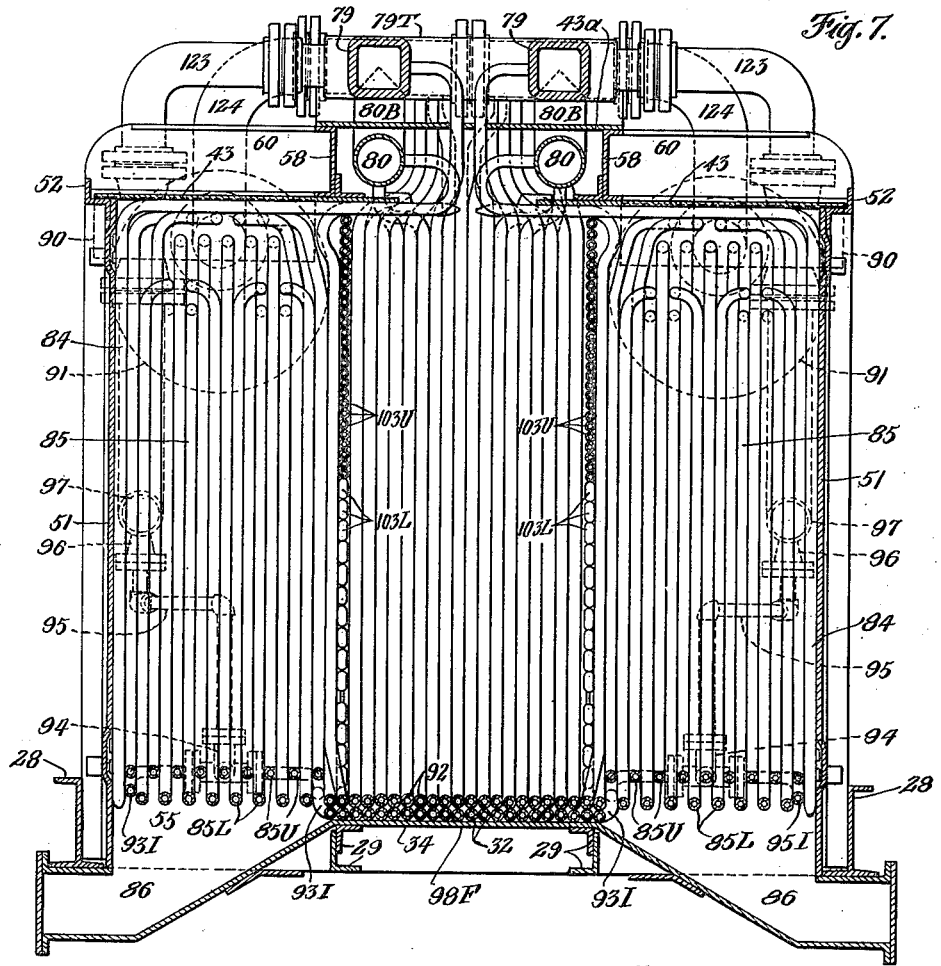
Figure 7 is a transverse section through the secondary combustion chamber or forward portion of the firebox, taken about on the line 7—7 of Figure 3B, illustrating in elevation many of the boiler elements which lie forwardly of the plane of the section.
Figure 6:
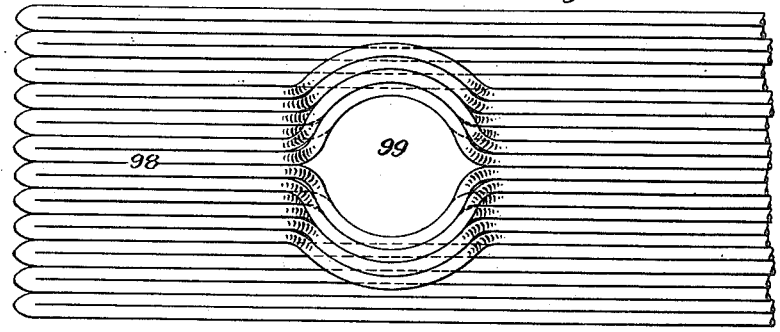
Figure 6 is a fragmentary plan view of the water tube elements disposed on the floor of the firebox in the region of the slag hole or entrance to the slag hopper.

The base of the shell, from the front end rearwardly to a point adjacent the front of the firebox region, is constituted by a pair of side beams 28 (see Figures 1, 7 and 8) and a pair of intermediate beams which may conveniently be formed of pairs of angle bars 29 as seen in Figures 3F and 7; all of these longitudinal beams being interconnected by transverse beams 30, 31, 32 and 33, as best seen in Figures 3F and 3B; and a deck plate 34 being secured to the longitudinal and transverse beams, in position to form a floor or bottom wall for the enclosed space of the shell.

At the back end, the side beams 28 run straight through (as shown in Figure 1) and not only stiffen the sides of the firebox structure but also provide a major part of the support for the deck 35 of the cab 36. Intermediate longitudinal beams 29, however, slope downwardly at 29a as shown in Figure 3B, and then extend at 29b horizontally at a lower level beneath the firebox (see also Figure 5). Further, in the firebox region, there are supplemental longitudinal members such as the angle bars 37, located immediately beneath the main longitudinal beams 28, and Z bars 38 spaced beneath said angle bars and located at the plane of the beams 29b. The firebox base structure is completed by transverse beams 39, 40 and 41 (see Figure 3B) and the firebox flooring 34a which is joined to the floor 34 of the main portion of the shell by the intermediate sloping floor 34b.

The side and top portions of the structural shell 17 will next be described, commencing at the rear end. Reference should here be made to Figures 1, 2B, 3B, 4, 5 and 7.

A back wall or sheet 42 (Figures 3B and 4) extends upwardly from the base to the level of the roof sheets 43 (see Figure 5) and is stiffened by transverse angle bars and beams 44, 45, 46 and 47 (Figure 3B) and by vertical members 48, 49 and 50 (Figure 4). The side walls 51 (Figures 4 and 5) extend upwardly from the base to the roof sheets 43, and are stiffened by the horizontal members 38, 37, 28 and 52, and by the vertical members 48, 53 and 54. The front end of the firebox proper terminates at the region of the vertical members 54, and at this point there are front wall plates 55 which extend inwardly to a juncture, at the angle members 56, with the side walls 57 forming the main part of the shell extending forwardly to the smokebox.

The framework of the firebox roof is composed of the side longitudinal rails 52 (Figures 5 and 7), the two main longitudinal beams 58 which run all the way up to the front end of the locomotive (see also Figures 1 and 2B), the main transverse beam 59 running clear across the back end of the firebox (Figures 2B, 3B and 5), and a series of short transverse beams 60 extending from the side rails 52 to the main beams 58 (Figures 1, 2B and 7). The transverse spacing between the main beams 58 corresponds to the width of the shell forwardly of the firebox, which encloses the chief convection heating surfaces of the boiler and defines the gas passageway from the firebox to the smokebox.

From Figures 5 and 7 it will be observed that the roof sheets 43, which close over only the side portions of the box, are secured to the roof framing at the level of the bottom of the main beams 58. The central region of the firebox extends upwardly between the beams 58 to house certain header pipes and tube coil connections, as shown, and this portion is covered by the roof sheet or cover plate 43a, which is secured on top of the main beams 58 and is reinforced by transverse bracing angle bars 43b which serve the additional function of supporting the superimposed headers, as seen in Figure 5.

Part of the cover plate 43a is broken away in Figure 2B, in order to show in plan view certain of the water tube coils adjacent to their juncture with the header pipes. Tubes down inside the firebox and also those which pass upwardly through the cover plate 43a are omitted from Figure 2B to avoid complication of the drawings.

Figure 8:
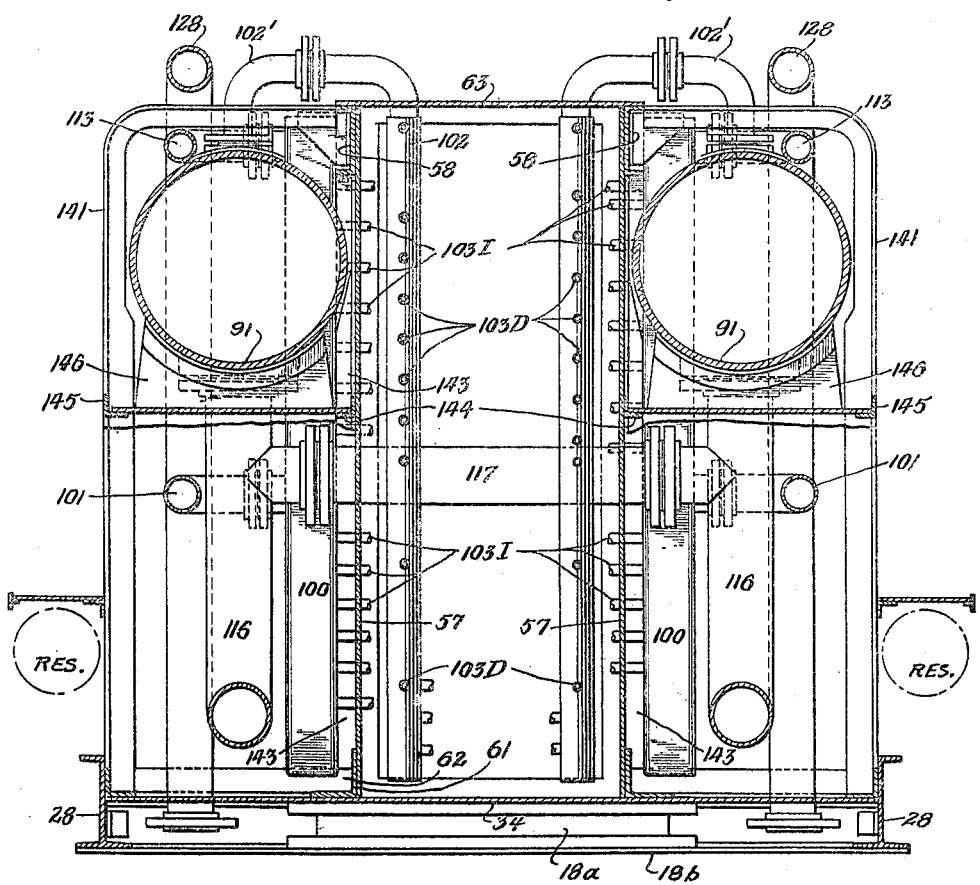
Figure 8 is an irregular transverse section through the shell and associated parts, in the region of the smokebox, taken on the line 8—8 of Figure 1, and illustrating the disposition and support of drums, headers and other parts.

From the front walls 55 of the firebox (Figure 4) the side walls 57 of the shell extend forwardly to the front end of the locomotive, as is seen from Figures 2F, 3F and 8. At their upper edges, these side sheets 57 are secured to the upper longitudinal beams 58; and at their lower edges they are secured by angle bars 61 and bracing plates 62 to the base deck 34. In the region of the smokebox, the enclosure is completed by a roof plate 63, and apertured front plate 64 with reinforcing 65, and front smokebox cover 66 (Figure 1). The base-plate 34 is apertured at 67 to pass the exhaust nozzle 68 (Figure 1), and the smokebox roof 63 is apertured at 69 to pass the internal extension 70 of the smoke stack 71.

In the intermediate region between the smokebox and the firebox (as best seen in Figures 2F and 3F), the roof plate 63a is largely cut away to form openings for the tube coils. There is a series of tube coil supporting frames, each composed of heavily-flanged front, rear and side members 72, 73, 74 and 74, having supplemental transverse members 75 to which the tube coils are secured. Substantially dished cover plates 76, 76a and 76b, having internal reinforcing webs 77, cooperate with the rectangular frames just described, to form composite beams for the firm support of the tube coils from the main longitudinal beams 58. Studs 63b detachably secure the framing and cover plates or lids to the roof sheet 63a and the side roof rails 58. Bolts or studs 63c, in turn, detachably secure the lids 76, 76a, 76b to their frames. These parts will again be referred to, when we come to the description of the tube coils and their mounting.

The structural shell which has just been described preferably receives its protection from the heat of combustion in a manner generally similar to that disclosed in our copending application No. 223,528, i. e., by being lined, throughout the firebox region and most of the remainder of the shell, with water circulating tubes or coils which constitute water-heating and steam-generating elements of the boiler. According to the present invention, these elements are arranged in a substantially improved manner, whereby the number of coil patterns required to complete the lining is materially reduced, the making of joints to the headers is simplified, the firm securing of the elements while maintaining freedom for expansion and contraction is improved, and the replacing of elements is made easier.

In describing the shell lining tubes, we will commence at the back of the firebox, and make reference especially to Figures 3B to 7 inclusive. The back wall 42 is largely covered by vertical tube coils 78, the inlet ends of which receive water from the inlet header structure 79, and the outlet ends of which deliver to the outlet headers 80. It will be observed that these outlet headers extend longitudinally and lie within the upper extension of the firebox space, just beneath the cover plate 43a, while the inlet headers 79 lie on top of said plate and are supported by the cross flanges 43b thereof.

In the mid region of the back of the firebox the tube units 78a and 78b (Figure 5) terminate short of the bottom of the firebox, to allow for the passage of the pulverized fuel burners 81 through the back wall. A refractory ignition wall 82 is preferably applied against the back wall tubes in the region of the burner outlets, and may also extend laterally to the sides of the box. A door for inspection and other purposes is provided at 83, this door opening out through the back plate 42 within the area of the framing 46 and 50. The tubes 78b are formed with substantially semi-circular bends 78b' to clear the door opening; and in order to clear these bends the tubes 78a are bent forwardly at 78a' as best seen in Figure 4.

The side and roof wall tubes for the firebox are constituted by L-shaped coils 84, running vertically at the sides and transversely at the roof. As seen in Figures 5 and 7, these units, extending inwardly toward each other at the roof, come close to meeting at the center, in order to form a screen to protect the otherwise unprotected roof beams 58 and cover plate 43a. Their inlet and outlet connections to the headers 79 and 80 are shown adjacent the center, in Figures 5, 7, and 2B.

As seen in Figure 4, there are front wall coils 85, positioned against the front firebox walls 55, at each side of the main gas passageway. These tubes have their alternate legs bent rearwardly in staggered inclined relation, as shown at 85U and 85L (Figures 3B and 7) to form a screen-like outlet for sponge slag and fly ash which can drop out of the passing gases into the lateral receptacles 86 provided for that purpose. From here, these tubes are bent upwardly and then rearwardly to form the side portions of the fire arch or baffle, the contour of the arch being shown at A in Figure 3B. The said side portions of the arch are designated 85A in Figure 4, and that figure (as well as Figure 3B) shows how the loops of the tube coils are bent around the transverse water-cooled supporting pipe 87. The nose and base of the arch are positioned by similar pipes 88 and 89. The tube coils 85 have their inlet ends coupled to the headers 90 (Figures 2B, 3B, 4 and 7), and their outlet ends extended forwardly as shown at 85E (Figure 4) and coupled directly to the steam-and-water drums 91.

The remainder of the arch A, i. e., the middle portion thereof, is formed by the bent loops 92A of the tube coils 92 (Figures 3B, 4 and 7), the forward ends of which run vertically, in staggered relation, as shown at 92F and 92R. As seen in Figure 4, these vertical portions of the tubes 92 form a cooling screen for the products of combustion through which the latter must pass before they encounter the major banks of convection tubes which lie forwardly thereof. As shown in Figures 2B, 3B and 7, the elements 92R are connected at their upper ends to the transverse portion 79T of the inlet header structure 79. The outlet ends of the elements 92F, as shown, are coupled some to the rear portion of the outlet headers 80 and some to the transverse outlet header pipes 80T.

The side portions of the floor of the firebox are covered with tube coils 93 (Figures 4 and 5), the inlet ends of which are shown at 93I (seen near the bottom of Figure 7). These inlet ends are fed from the T-shaped connections 94 which are coupled by piping 95 (Figures 1, 3B, 4 and 7) and fittings 96 to the pump delivery conduits 97. The outlet or discharge ends of the side floor coils run up the back wall of the firebox as shown at 93D in Figure 4. These are coupled into the longitudinal outlet headers 89 as shown in Figure 2B.

The remaining portion of the floor lining tubes of the firebox is constituted by tubing 98 (Figures 3B, 4, 5 and 6). These floor elements—the central ones of which are bent upward and laterally to overlap each other and to leave a central slag tap-hole 99—extend obliquely upwardly at 98B (Figure 3B) and thence forwardly at 98F (Figures 3B, 4 and 7) to form the floor lining of the main deck 34 within the gas passageway extending forwardly toward the smokebox. The inlet ends of the forwardly extending elements 98F are coupled to the vertical delivery headers 100 (Figures 1, 2F and 3F) which receive water from the forwardly extending pump delivery lines 101. The outlet ends of these coils are coupled to the vertical header pipes 102, which at the top have transverse connection pipes 102' coupled directly to the drums 91 (Figures 2F and 8).

Turning now to the lining for the side walls 57 of the main body of the shell, it will be seen from Figures 3B, 3F, 4 and 7 that from the level of the floor or deck 34 up to the level of the top of the fire arch A, the side wall tube coils 103L have their rear end loops in alignment with the front of the firebox; i. e., they extend back only to the rear end of the side walls 57 of the main gas passageway. The upper side wall tubes 103U, however, extend back into the firebox and form a U-shaped nose 103N (see particularly Figure 4). At the front, the inlet ends 103I of all these tubes are connected into the vertical delivery headers 100 (see Figures 3F and 8), while their outlet or discharge ends 103D are connected into the vertical discharge headers 102.

Referring again to Figures 3B and 4, the tube coils 103U, forming the nose 103N, are supported in the firebox on a transverse water-cooled pipe 104, and the nose 103N is thus positioned immediately above the top of the fire arch A. By this arrangement, the combustion stream, commencing at the burners 81, must make an elongated vertical S-curve, first beneath the arch and then above the same (as seen in Figure 3B); must thereafter divide so as to pass around each side of the nose (as seen in plan in Figure 4); must then pass downwardly at each side of the nose, forwardly of the arch, in a zone which may be considered a secondary combustion chamber; and then pass forwardly through the vertical cooling screen of pipes 92R and 92F (Figure 4), and from thence forwardly within the main body of the shell which defines the path of combustion to the smokebox. In this way, a substantial area of tubing is subjected to radiant heat within the firebox, a long pathway for the fuel and flame stream is provided, and sufficient cooling of the products of combustion is assured, whereby we secure substantially complete combustion, a high steaming capacity, adequate cooling of the products of combustion before they encounter the superheater elements (later to be described) so as to avoid burning out thereof, and a cooling of any slag particles carried over the arch sufficiently to cause them to drop into the hoppers in the region of the secondary combustion chamber and to prevent them from adhering to the main body of evaporating tubes in the convection heating area. Further, the main body of slag within the firebox proper, which runs or drops in a molten condition onto the floor tubes 93 and 98, forms a solidified protecting layer on said tubes, and the slag over and above this layer flows down through the outlet 99 into the refractory lined hopper 24, which flares downwardly and is provided with a dumping door at the bottom, as shown.

Turning now to the main body of convection heating surface, it will be seen from Figures 2F and 3F that this takes the form of bundles of tube coils, indicated generally at C1 and C2. Although these two groups are of different size, they are otherwise similar, and a detailed description of one will suffice.

The tube coil units 105 are of sinuous formation with their passes running vertically. Each unit lies in a single vertical longitudinal plane, and laterally adjacent units are in abutting relation, but their passes and bends are staggered, as shown, so that the gases passing toward the smokebox take sinuous paths between the individual elements of the tubes. Adjacent loops of each unit are secured together as by welding to double-seated brackets 106. The detail of this is seen in Figure 10.

At their lower ends, the front and rear elements of alternate units are respectively bent out of line, as shown in Figure 3F, to permit the passing of water-cooled positioning tubes 107 transversely through the entire bank. At their upper ends there are two means of support and positioning for the tubes (in addition to the inter-tube clamps 106). First, there are L-shaped hangers 108 welded to the upper loops of the tube units and hooked onto the flanges of the transverse beams 75. Second, the transverse delivery and discharge headers 109 and 110, to which the inlet and outlet ends of the tube units are connected, are seated in the side frame members 74 and thus also serve as tube supports.

These headers, like the delivery header construction 79 over the firebox, and certain others, are formed to a square cross-section to facilitate the making of numerous tube connections thereto. In addition, they are set with their flat sides at such angles as to accommodate two rows of tube connections at one header face, with a minimum of bending of the tube ends (as seen in Figure 3F). The seating of the headers in the side frame members 74 is preferably by means of round outlet pipes 109', 110', which in turn are coupled to the delivery and discharge lines 111 and 112. The delivery lines 111 receive their circulation from pipes 113 which are connected into the upper ends of the front vertical headers 100, and the discharge lines 112 are connected directly into the drums 91.

The foregoing arrangement of the main transverse headers 109 and 110 has the further advantage of providing a series of cross-connections between the circulating system on the right side of the locomotive and the circulating system on the left side, each side being provided with a circulating pump 114 (one of which is shown in Figure 1 and the other in Figure 3F) so that if one pump fails the complete boiler will still be served by the other pump, as is the case in our copending application. Before proceeding to the superheater, the remaining elements of the water circulating system will be described.

Each pump, which may be driven by a steam turbine 115, takes water from a drum 91 through the main intake pipe 116. These two pipes are cross-connected as shown at 117 in Figures 1, 2F, 3F and 8. Each pump discharge line has a check valve, to prevent bypassing of the circulation from one pump through the other, in the event of failure of one of the pumps. In the embodiment shown, although a single check valve placed immediately at the pump outlet would suffice, for convenience of arrangement we have shown separate check valves 118, 119, in the two discharge branches 97 and 101 of each pump. Beyond each check valve, in each of the main discharge branches 97, a feedwater inlet connection 120 may be provided, to these being coupled the feedwater line 120' from an injector or from the pump 121 mounted under the cab. For the sake of clarity, this piping 120, 120', is shown only fragmentarily in Figure 1, but it will be understood that such location of the feedwater lines ensures a delivery of water to all of the coils of the boiler, and a circulation through all of them even if both of the circulating pumps 114 should fail.

From the delivery pipe 97 on the right-hand side of the locomotive (as seen in Figures 1 and 4) water is delivered through connection 96, pipe 95, header 94 and piping 95B, to the water-cooled transverse supporting pipes 87, 88, 89 and 104; and through fitting 96 and piping 95F (as seen in Figure 1) water is delivered to the transverse supporting pipes 107 which aid in positioning the convection heating units and the superheater. All these transverse supporting pipes have their discharge outlets on the left side of the locomotive, where (as seen in Figures 3B and 4) they are connected by a pipe system 122 which is connected into the intake side of one of the pumps, for example by connection to the bottom of the left-hand drum 91.

The delivery connections from the pump delivery lines 97 to the headers 90 are clearly shown in Figures 1, 2B, 3B, 4B and 7. In Figures 2B and 7 it will be observed that elbows 123 connect the headers 90 into the ends of the transverse portion 79T of the main inlet header construction 79, 79, over the firebox.

As seen in Figures 1, 2F, 3F and 8, the forwardly extending pump delivery lines 101 are coupled to the vertical headers 100, adjacent the middle of the latter; and these in turn have at their upper ends the pipes 113, which have branches 111 delivering into the headers 109 of the two main banks of convection tubes.

The return circulation from outlet headers 80 (Figure 7) is by way of branches 80B coupled to transverse piping 80T (Figures 2B and 3B) and from thence into the rear ends of the drums 91 by the pipes 124 as shown (see Figures 4 and 7).

The front vertical return headers 102 (Figures 2F, 3F and 8) are connected into the drums 91 by pipes 102'.

The transverse return headers 110 of the convection banks are coupled into the drums 91 by the pipes 112.

The return circulation from the bottom of drums 91 into the pumps is by means of the main pump intake lines 116 (which, as before pointed out, are cross-connected by the pipe 117).

The foregoing completes the description of the major elements of the water circulating system, by which the water is normally circulated through the boiler tubes at a rate substantially in excess of the normal evaporating rate. We now turn to the handling of the steam.

Steam is taken from the top of the two drums 91 by means of the steam pipes 125 (Figures 1 and 2F) which are coupled to the ends of the transverse steam inlet header 126 of the superheater unit S. Since this unit in its general construction, arrangement, and support, is similar to the evaporating units C1 and C2, it need not be described in detail. Its outlet header 127 (Figure 3B) preferably contains the locomotive throttle (not shown) and from same the steam pipes 128 extend forwardly at each side of the locomotive, and these at their front ends are bent downwardly (as best seen in Figures 1 and 3F) and are coupled to the steam inlets 129 of the steam chests for the cylinders.

Before leaving the boiler proper, reference will now be made to the details of Figures 9 to 15 inclusive.

Figure 9:
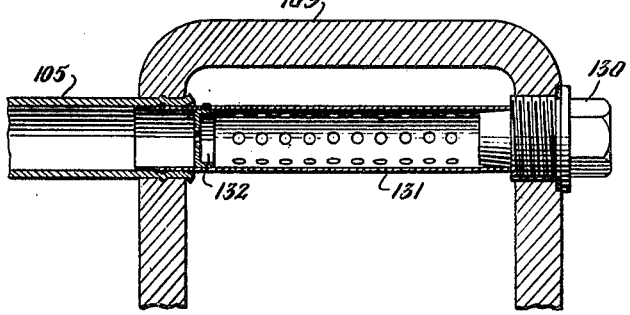
Figure 9 is a detail section, to a larger scale, showing a boiler tube connection to its header, with an associated restricted inlet, and other parts.

Figure 9 shows fragmentarily the end of one of the tubes (for example, a tube 105 of the bank C2) rolled into a wall of inlet header 109. A plug 130 closes the opening in the opposite wall of the header and also serves to position a screen member 131 which carries an apertured disk 132 which provides a restricted inlet or orifice for the tube 105. By this means, there is maintained a pressure drop between the headers and the tubes, so that proper circulation through all of the tubes is assured.

Figure 10 shows one of the securing brackets or clamps 106 between two tube elements, as already described with reference to one of the banks of convection tubes.

Figures 11 and 12 show in detail the preferred method of securing in place the loop ends of a multi-pass tube coil unit, such as one of the units which form the lining of the shell. The fastening device (one of which is designated F in Figure 3B) comprises a pair of straps 133 and 134, one short and one long, the first of which is welded to the inner or adjacent tube elements of two abutting tube loops, the other being welded to the outer or non-adjacent elements. Although they lie on the same side of the tube coil, the arrangement will readily be seen to be such as to prevent relative disalignment of the two loops in either direction from their common plane. At the same time, these devices permit free longitudinal expansion and contraction of the coil elements. One of the straps (in this case, the short one) carries a stud 135 which extends loosely through an aperture 136 in the shell wall, and is there secured by means of a washer 137 and a key 138. A closure cap 139 can be welded in place over this assembly, to prevent ingress of air or egress of gases. The shell wall is dented or humped outwardly at 140 to form a pocket to accommodate the straps, whereby the tube coil lies flat against the shell wall 42.

A generally similar fastening arrangement for the opposite end of the tube coil is shown in Figures 13, 14 and 15, wherein similar fastening elements are employed, except that the straps 133' and 134' are both long enough to underlie four tube elements, and the stud is secured to the one which is fastened to the outermost elements of the group. At this end of the coil, the outermost tube elements are adapted to be connected to inlet and discharge headers (not shown) which fix said connected ends of the tube, and these ends may thus be conveniently joined by the strap 134' carrying the securing stud 135'; whereas the two parts forming the central loop are joined by the strap 133', which, however, has a relative sliding engagement with the outermost elements of the coil, to permit expansion and contraction of the central loop of the coil toward and away from the headers. Thus, expansion and contraction of the coil relative to the wall of the shell, and also contractions and expansions of different parts of the coil relative to each other, can take place, without putting a strain upon the coil or its joints with the headers; while at the same time each element of each tube coil is maintained in protective juxtaposition to the shell wall, and is held as against vibration, which would otherwise cause excessive wear.

The various tube securing means hereinbefore described are claimed, per se, in our copending divisional application Serial No. 456,010, filed August 25, 1942.

Turning now to Figures 1, 2B, 2F and 8, it will be observed that at the sides of the main portion of the shell there is a reinforcing framework, which also serves to support a contour-defining sheath 147 and/or an insulating covering (generally in the manner of our prior copending application No. 223,528). This framework is, however, of an improved construction, and adapted to cooperate with the longitudinal drums 91, pumps 114 and other parts now to be referred to.

The framework, at each side, comprises angle members or equivalent structural parts 141, which extend laterally from the upper longitudinal beams 58, and thence downwardly to the main side beams 28. At the latter regions, supplemental transverse braces 142 are located, in positions to reinforce the deck plate 34. Vertically extending angle braces 143 are secured to the outer faces of the side walls 57. Longitudinally extending angle bars 144 further stiffen the side wall plates 57 and similar longitudinals 145 interconnect the vertical braces 141, about mid-way of their height. These members, in turn, support flanged plates 146 which carry the drums 91, and the drums thereby become a major stiffening element for the shell structure considered as a whole. Plates 146 are shown only fragmentarily in Figure 8, but it will be understood that they may extend downwardly all the way to the deck 34, to form substantial stiffening means lying in the vertical transverse plane.

The space extending forwardly from the front of the firebox, at the outer sides of the main side walls 57 of the shell, beneath the drums, is utilized for boiler circulating equipment such as the pumps 114, the check valves 118, 119, main pipe lines 97, 101, 116, etc., and may also house various auxiliaries in addition to the pumps, such as the sand box and air compressor seen in Figure 1. Air reservoirs may be mounted centrally beneath the base of the shell and/or beneath the running boards or footwalks at one or both sides, as shown. (The running boards are omitted from Figure 1 but are shown in Figure 8.) By such disposition of the equipment, we secure compactness, firm support, desirable distribution of weight, and ease of enclosure and streamlining.

An outer sheath 147, shown in section in Figure 2B and broken away in Fig. 2F (but omitted in most of the views), may extend from the base of the structure, straight up the sides, and across the top, being supported and positioned by the various upright members 48, 53, 54 and 141. This sheath 147 retains the insulating lagging within it, as shown fragmentarily in Fig. 4. At the top, the sheath may be positioned by the flanged supports 59, 60, and the like (the headers, pipes and cover plates 79, 123, 128, 76, 76a, 76b, etc., being separately insulated), or the external sheath may be carried over the top of said parts.

From the foregoing description of the structure, it will now be readily understood how we achieve the objects set out at the beginning of the specification, and secure various advantages, some of which may be summarized as follows:

By the generally rectangular shape of the structure, particularly in the region of the firebox, we secure ease of fabrication, and also a readier application of the water tube coils to the internal faces of the walls, whereby a reduction in the number of patterns of coils is secured. Increase in the volume of the combustion space and increase in the heating surface is also secured. The arrangement of the side wall tubes in the firebox in the vertical direction, with these tubes bent to extend transversely at the top so as to define the roof of the furnace chamber, simplifies the arrangement and support of these tubes, as well as the connection thereof to the headers. Furthermore, the use of vertical coils in the firebox walls, with headers along the top of the firebox, is an added factor of safety for the screw in the cab, since it prevents the water from draining from these coils back to the drums, in the event of complete pump and check valve failure.

The use of the water tube arch reduces the amount of brickwork necessary in the firebox, and increases the heating surface at the region of most intense combustion and heat release. At the same time, the protective brickwork around the burner outlets at the rear, when once heated up, serves as an ignition wall to aid in the initial ignition of the pulverized coal or fuel oil as it enters the chamber. At this point it may be observed that by omitting the floor coils in the firebox, and substituting a grate for the firebox floor, the locomotive can readily be converted for burning lump fuel. In the arrangement as shown, the withdrawal of floor tubes for repair or replacement may be done either by dropping the floor plates in the firebox area, or by withdrawal of these tubes longitudinally through the smokebox front cover.

The S-shaped path of travel for the combustion stream assures a long flow-path which gives the necessary time and turbulence for efficient combustion, particularly of pulverized coal. The exceptionally large firebox volume, which by the present arrangement is not only very much greater than the volume in ordinary locomotive construction of identical clearance limitations, but even exceeds that which would be possible by the arrangement of our copending application No. 223,528, further aids in securing complete combustion, and results in a large fuel burning capacity without the necessity for a forced rate of operation or an excessive speed of travel of the combustion stream.

The running of the arch tube coils vertically at the front of the firebox greatly simplifies the arch design and the problem of connecting these tubes to the headers. At the same time, the central group, by staggering of their vertical portions, form an additional screen for the superheater.

Although the square front corners of the firebox might be expected to result in more or less dead pockets, this is prevented by the U-shaped baffle which projects from the main body of the shell back into the firebox, since this baffle causes a division of the combustion stream and a diversion of it downwardly into the corners of the firebox, prior to its reunition between and within said baffle for passage forwardly therefrom. In this and in the function of shielding the superheater from the most intense radiant heat, this baffle cooperates with the fire arch and the cooling screen forwardly thereof.

The horizontal disposition of the side wall tubes in the main gas passageway to the smokebox permits the use of long coil units here as well as at the floor, which not only simplifies their installation, but also simplifies their connection to headers at the front end. The superheater and main convection banks of coils are, however, arranged vertically, with a staggered disposition of their elements to provide increased rate of heat transfer. The vertical tube bank arrangement is also useful in order to secure greater ease of individual removal and replacement, and also in order to permit the use of sufficient crossties at various points along the top of the shell so as to increase the strength and stiffness of the latter. The support of these tubes against vibration and consequent loosening and wear is also thereby improved. Further, the headers can serve the additional combined functions of cross-connections for the parallel circulating systems connected to the duplicate pumps, and of supporting means for the tube bundles and bracing means for the shell. These headers are clamped between the mounting frames and the cover plates, and the frames in turn are secured over the openings in the top of the shell, so that each bank of tubes with its headers, supporting frame and cover plate, can be handled as a unit. By withdrawing the transverse positioning tubes near the bottom of the unit, disconnecting the header couplings, and unscrewing the fastening studs at the top, the complete unit can be lifted right out of the shell, which is of value not only in connection with repair or replacement, but also for the purpose of cleaning. On the other hand, the fastening means for the cover plates may be loosened, and the plates removed separately, for purposes of inspection.

As to the structure of the shell, it will be clear that it and the drums are coordinated to form a very rigid structure with a minimum of material, so that the whole structure can act as stiff foundation means for the locomotive as well as serve for housing and supporting the evaporating elements of the boiler. A certain proportion of the boiler elements, in turn, is used to form a protective and cooling lining for the shell, essentially in accordance with our prior filed copending application, but in an improved manner. The fastening means for the lining tubes are such as to assure close and secure positioning of said tubes against the inside surfaces of the shell, which also avoids short-circuiting of the gases behind the tubes, while at the same time providing the necessary freedom for expansion and contraction of the tubes relative to the shell.

We claim:

1. A steam locomotive comprising a horizontally elongated pressure-free shell largely enclosing the path of the products of combustion from the zone of combustion to the zone of discharge of said products, said shell being transversely narrower than said combustion zone forwardly thereof, steam generating means housed within said shell, steam collecting drums extending longitudinally along the sides of said shell near the top thereof, and pump mechanism and other locomotive auxiliaries mounted in the space on each side of the shell beneath said drums.

2. A construction according to claim 1, wherein said shell has stiffening means so that it constitutes a major strength element of the locomotive foundation.

3. In steam locomotive construction having a horizontally elongated pressure-free shell largely enclosing the path of the products of combustion from the zone of combustion to the zone of discharge of said products, steam generating means associated with the shell comprising water circulating tube coils lining the shell at the zone of combustion, the majority of the tubes whereof have return bends at the bottom and run vertically at the walls of said zone and thence extend transversely at the roof thereof in close and substantially parallel juxtaposition, and have inlet and outlet ends adjacent the roof.

4. A construction as defined in claim 3, further having longitudinally extending water-filled header means adjacent said roof, to which are connected a plurality of the tube coils defining said walls and roof.

5. In steam locomotive construction having a horizontally elongated pressure-free shell largely enclosing the path of the products of combustion from the zone of combustion to the zone of discharge of said products, steam generating means associated with the shell comprising forced circulation tube coils chiefly defining the zone of combustion and forming baffle means positioned to effect an elongation of the travel of the combustion stream, said baffle means including generally longitudinally extending tubes configured to form a transverse fire arch and further having substantially upright portions adjacent the front of the combustion zone positioned to serve in defining a secondary combustion space beyond the arch.

6. A construction according to claim 5, wherein some of said upright portions of said tubes form a cooling screen located in the path of the products of combustion as the latter leave the combustion zone and pass forwardly within the main body of the shell.

7. A construction according to claim 5, wherein some of said upright portions of said tubes form the lining of the front wall areas of the combustion zone adjacent the side walls thereof.

8. In steam locomotive construction having a horizontally elongated pressure-free shell largely enclosing the path of the products of combustion from the zone of combustion to the zone of discharge of said products, steam generating means associated with the shell comprising forced circulation tube coils lining the major portion of the shell, the majority of the tubes of the combustion zone walls being generating tubes extending vertically and being coupled to header means in the region of the combustion zone roof, and the majority of the tubes lining the passageway forward of the combustion zone being generating tubes extended longitudinally and being connected to header means located adjacent the discharge end of the shell, and common steam take-off means into which the outlet header means of both the vertical and horizontal generating tubes deliver.

9. In steam locomotive construction having a horizontally elongated pressure-free shell largely enclosing the path of the products of combustion from the zone of combustion to the zone of discharge of said products and being of substantially reduced transverse dimension forwardly of said zone, steam generating means associated with the shell comprising forced circulation tube coils lining the side walls of said shell forwardly of said zone and extending rearwardly into the combustion space and there configured to form a baffle for the products of combustion.

10. In steam locomotive construction having a horizontally elongated pressure-free shell largely enclosing the path of the products of combustion from the zone of combustion to the zone of discharge of said products and being of substantially reduced transverse dimension forwardly of said zone, steam generating means associated with the shell comprising forced circulation tube coils lining the side walls of said shell forwardly of said zone and extending rearwardly into the combustion space and there configured to form a U- shaped baffle, viewed in plan, in the upper part of the combustion zone; together with a fire arch lying beneath the nose of said baffle and cooperating therewith to provide first a sinuous and thereafter a divided path for the products of combustion.

11. A construction according to claim 10, wherein said fire arch extends downwardly at its front end to provide a space beneath said baffle wherein the divided combustion stream is reunited for passage through the main part of the shell to the discharge end of the latter.

12. In steam locomotive construction having a horizontally elongated pressure-free shell largely enclosing the path of the products of combustion from the zone of combustion to the zone of discharge of said products, steam generating means associated with the shell comprising water circulating tube coils lining the major portion of the shell and forming baffle means for the combustion stream, and further comprising transversely extending water tubes located to support and position the tube elements of said baffle means intermediate their ends.

13. In steam locomotive construction having a horizontally elongated pressure-free shell largely enclosing the path of the products of combustion from the zone of combustion to the zone of discharge of said products, steam generating means associated with the shell comprising forced circulation tube coils lining the side walls of said shell in the region between said zones and extending lengthwise along said walls, and banks of tubes extending vertically substantially throughout the maximum vertical depth of the shell between said lined side walls and comprising the major evaporating surface in that region.

14. A construction according to claim 13, wherein there are vertical headers to which a number of longitudinally extending tubes are connected in parallel, and transverse headers to which a number of vertically extending tubes are connected in parallel.

15. In steam locomotive construction having a horizontally elongated pressure-free shell largely enclosing the path of the products of combustion from the zone of combustion to the zone of discharge of said products, steam generating means associated with the shell comprising forced circulation tube coils lining the side walls of said shell in the region between said zones, banks of tubes extending vertically between said lined side walls and constituting the major part of the tubing in that region, and means mounting different vertical tube banks for removal and replacement independently of each other, said mounting means being constructed to accommodate removal of a vertical tube bank directly from its mounted position by a movement transverse to the length of the shell.

16. A construction according to claim 15, wherein said mounting means comprise horizontally extending headers into which the ends of a plurality of tube units of a bank are connected in parallel.

17. A construction according to claim 15, wherein said mounting means comprise framing lying in a generally horizontal plane, from which the upper ends of the tube units of a bank are hung.

18. A construction according to claim 15, wherein said mounting means comprise framing lying in a generally horizontal plane, from which the upper ends of the tube units of a bank are hung, said framing constituting a rigid interbrace between said side walls.

19. A construction according to claim 15, wherein said mounting means comprise framing by which said banks are hung from the top of the shell, and transverse positioning means near the bottom of said banks.

20. In steam locomotive construction having a horizontally elongated pressure-free shell largely enclosing the path of the products of combustion from the zone of combustion to the zone of discharge of said products, steam generating means associated with the shell comprising forced circulation tube coils arranged in a longitudinal row of vertically extending banks and located within the shell in the region between said zones, horizontal steam-and-water drums positioned laterally outside the side walls of said shell, and connections between said drums and said tube coils.

21. In steam locomotive construction having a horizontally elongated pressure-free shell largely enclosing the path of the products of combustion from the zone of combustion to the zone of discharge of said products, steam generating means associated with the shell comprising water circulating tube coils lining the shell at the zone of combustion, the majority of the tubes whereof run vertically at the walls of said zone and thence extend transversely at the roof thereof, the bottom of the combustion zone being defined chiefly by longitudinally-extending tube coils having header means forwardly of said zone.

22. A construction according to claim 21 wherein the tubes at the roof extend from each side transversely to approximately the longitudinally center line, and longitudinally-extending header means are there positioned and coupled to said tubes.

23. In steam locomotive construction having a horizontally elongated pressure-free shell largely enclosing the path of the products of combustion from the zone of combustion to the zone of discharge of said products, steam generating means associated with the shell comprising forced circulation tube coils lining the side walls of said shell in the region between said zones, banks of tubes extending vertically between said lined side walls and constituting the major part of the tubing in that region, and means mounting one bank for removal and replacement independently of another bank, said mounting means comprising transversely extending headers into which the ends of the tube units of a bank are connected, together with delivery and discharge pipes connecting the inlet and outlet headers respectively, of a plurality of banks, in parallel.

24. In steam locomotive construction having a horizontally elongated pressure-free shell largely enclosing the path of the products of combustion from the zone of combustion to the zone of discharge of said products, steam generating means associated with the shell comprising forced circulation tube coils lining the side walls of said shell in the region between said zones, banks of tubes extending vertically between said lined side walls and constituting the major part of the tubing in that region, and means mounting one bank for removal and replacement independently of another bank, said mounting means comprising beam-like coverplates for the closing of apertures in the top of the shell through which said banks may be removed.

25. In steam locomotive construction having a horizontally elongated pressure-free shell largely enclosing the path of the products of combustion from the zone of combustion to the zone of discharge of said products, steam generating means associated with the shell comprising forced circulation tube coils lining the side walls of said shell in the region between said zones, banks of tubes extending vertically between said lined side walls and constituting the major part of the tubing in that region, and means mounting one bank for removal and replacement independently of another bank, said mounting means comprising composite beams formed of a horizontal frame and a coverplate, together with means securing same to the shell for unitary or separate removal.

26. In steam locomotive construction having a horizontally elongated pressure-free shell largely enclosing the path of the products of combustion from the zone of combustion to the zone of discharge of said products, steam generating means associated with the shell comprising forced circulation tube coils lining most of the combustion zone and the side walls in the region between said zones, banks of water tube coils extending vertically between said lined side walls, and a superheater located in said shell between said combustion zone and said banks, and forced circulation tube coils positioned to form shielding means between the superheater and the region of most intense combustion, said shielding means comprising a U-shaped baffle forming a juncture between lining tubes for the two side walls of said shell.

27. In steam locomotive construction having a horizontally elongated pressure-free shell largely enclosing the path of the products of combustion from the zone of combustion to the zone of discharge of said products, steam generating means associated with the shell comprising forced circulation tube coils lining most of the combustion zone and the side walls in the region between said zones, banks of water tube coils extending vertically between said lined side walls, and a superheater located in said shell between said combustion zone and said banks, and forced circulation tube coils positioned to form shielding means between the superheater and the region of most intense combustion, said shielding means comprising a screen of vertical tubes arranged with their centers in staggered relation.

28. In steam locomotive construction having a horizontally elongated pressure-free shell largely enclosing the path of the products of combustion from the zone of combustion to the zone of discharge of said products, steam generating means associated with the shell comprising forced circulation tube coils arranged in banks extending vertically and located within the shell in the region between said zones, horizontal steam-and-water drums positioned outside the side walls of said shell, and connections between said drums and said tube coils, including separable joints lying in vertical planes, upon uncoupling whereof said banks may be independently lifted vertically from within said shell.

29. In steam locomotive construction, a pressure-free shell extending lengthwise of the locomotive and forming a passage for a heating medium extending forwardly from a firebox, a multiplicity of steam generating units housed within said shell for subjection to the heating medium, said shell being narrower than the firebox in a region forwardly thereof, and a circulating system for said generating units, comprising conduits located outside of said shell and laterally thereof in the space left by the narrowing of said shell ahead of the firebox, and collector drum means disposed laterally of said shell, said drum means and conduits of the circulating system being disposed one above another.

30. In steam locomotive construction, a pressure-free shell extending lengthwise of the locomotive and forming a passage for a heating medium extending forwardly from a firebox, a multiplicity of steam generating units housed within said shell for subjection to the heating medium, said shell being narrower than the firebox in a region forwardly thereof, and a circulating system for said generating units, comprising conduits located outside of said shell and laterally thereof in the space left by the narrowing of said shell ahead of the firebox, and collector drum means disposed laterally of said shell, and circulating pump means located adjacent the front end of the locomotive.

31. In steam locomotive construction, a pressure-free shell extending lengthwise of the locomotive and forming a passage for a heating medium extending forwardly from a firebox, a multiplicity of steam generating units housed within said shell for subjection to the heating medium, said shell being narrower than the firebox in a region forwardly thereof, and a circulating system for said generating units, comprising conduits located outside of said shell and laterally thereof in the space left by the narrowing of said shell ahead of the firebox, and collector drum means disposed laterally of said shell, and circulating pump means located adjacent the front end of the locomotive, together with shielding means positioned externally of the circulating system, drum means and pump means and adapted to prevent excessive heat losses therefrom.

32. In steam locomotive construction having a horizontally elongated pressure-free shell largely enclosing the path of the products of combustion from the zone of combustion to the zone of discharge of said products, steam generating means associated with the shell comprising water tube coils arranged in looped or sinuous formation and in close juxtaposition so as to define the zone of combustion and to form baffle means positioned to effect an elongation of the travel of the combustion stream, certain of the combustion chamber wall tubes being extended into the chamber space and looped back to a wall area to form such baffle means, and means for positively effecting a closed-circuit water-flow through said coils.

33. In steam locomotive construction having a horizontally elongated pressure-free shell largely enclosing the path of the products of combustion from the zone of combustion to the zone of discharge of said products, steam generating means associated with the shell comprising water tube coils arranged in looped or sinuous formation and in close juxtaposition so as to define the zone of combustion and to form baffle means positioned to effect an elongation of the travel of the combustion stream, said baffle means comprising generally longitudinally extending tube elements in close juxtaposition and configured to form a transverse fire arch, and means for positively effecting a closed-circuit water-flow through said coils.

34. In steam locomotive construction having a horizontally elongated pressure-free shell largely enclosing the path of the products of combustion from the zone of combustion to the zone of discharge of said products, steam generating means associated with the shell comprising water tube coils arranged in looped or sinuous formation and in close juxtaposition so as to define the zone of combustion and to form baffle means positioned to effect an elongation of the travel of the combustion stream, such baffle tubes extending longitudinally into the main portion of the shell beyond said zone of combustion and being therein positioned against the side walls of said portion of the shell, and means for positively effecting a closed-circuit water-flow through said coils.

WILLIAM E. WOODARD.
ARTHUR H. FILANDER.

CERTIFICATE OF CORRECTION.

Patent No. 2,346,715.

April 18, 1944.

WILLIAM E. WOODARD, ET AL.

It is hereby certified that error appears in the printed specification of the above numbered patent requiring correction as follows: Page 6, second column, line 10, for "screw" read --crew--; page 8, first column, line 68, claim 17, for "comprise" read --comprises--; and second column, line 35, claim 22, for "longitudinally" read --longitudinal--; and that the said Letters Patent should be read with this correction therein that the same may conform to the record of the case in the Patent Office.

Signed and sealed this 6th day of June, A. D. 1944.

(Seal)

Leslie Frazer
Acting Commissioner of Patents.